July 11, 1939. W. G. MYLIUS Re. 21,148

METER BASE

Original Filed Sept. 29, 1934 2 Sheets-Sheet 1

WITNESSES:
Fred C. Williams

INVENTOR
Walter G. Mylius
BY
ATTORNEY

July 11, 1939. W. G. MYLIUS Re. 21,148

METER BASE

Original Filed Sept. 29, 1934 2 Sheets-Sheet 2

WITNESSES:
Fred C. Pilham

INVENTOR
Walter G. Mylius
BY
W. Waltman
ATTORNEY

Reissued July 11, 1939

Re. 21,148

UNITED STATES PATENT OFFICE 21,148

METER BASE

Walter G. Mylius, Summit, N. J., assignor to Westinghouse Electric & Manufacturing Company, East Pittsburgh, Pa., a corporation of Pennsylvania Original No. 2,088,480, dated July 27, 1937, Serial No. 746,188, September 29, 1934. Application for reissue April 28, 1938, Serial No. 204,925

8 Claims. (Cl. 175—224)

Figure 1:
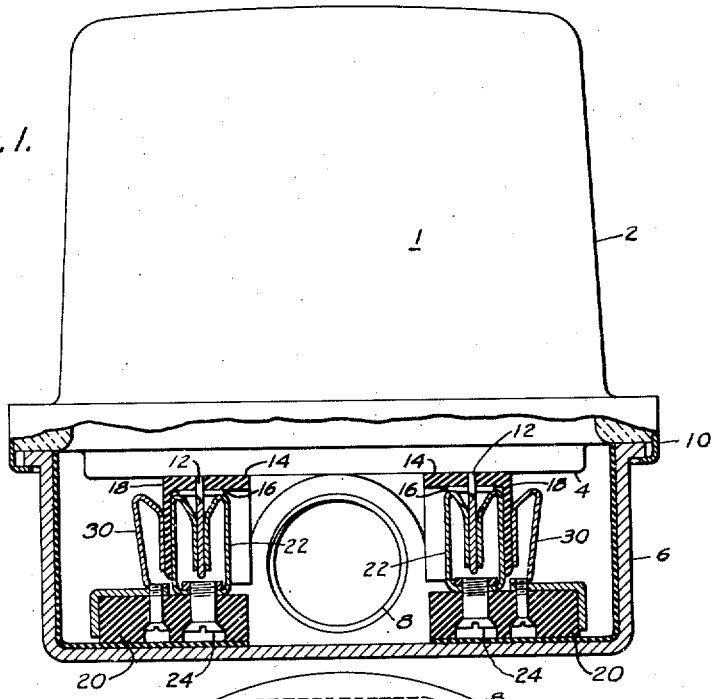

The invention relates to casings for electrical instruments and a preferred embodiment relates to an improved mounting for watthour meters.

Detachable watthour meters of the general character disclosed in Patent 1,969,499, issued August 7, 1934, to W. M. Bradshaw, W. G. Mylius, and B. G. La Bar, are coming into extensive commercial use in view of the many advantages of this type of mounting. In accordance with the usual practice, however, when a watthour meter is removed from its supporting base receptacle, the circuit to the consumers' outlets is broken because the meter itself constitutes the electrical connection between the supply and load circuits. Therefore, even though a meter is removed only temporarily, the customer's service will be interrupted resulting in inconvenience under some circumstances.

It is an object of the present invention, therefore, to provide a detachable mounting for an electrical instrument casing such that when the casing is removed from its supporting base receptacle, auxiliary contact devices are automatically effective to maintain a circuit through the receptacle.

In accordance with the present invention the supporting base receptacle includes a plurality of contact blades which are adapted to be engaged by correspondingly disposed blades on the base of the electrical instrument casing to provide a circuit connection to the instrument mechanism within the casing. Auxiliary contact means are disposed in the base receptacle normally in a position to electrically bridge certain of the main contact blades, and means are provided on the base of the instrument casing to engage these auxiliary blades to break the bridge circuit when the instrument casing is in operative position with respect to the base receptacle.

Figure 2:
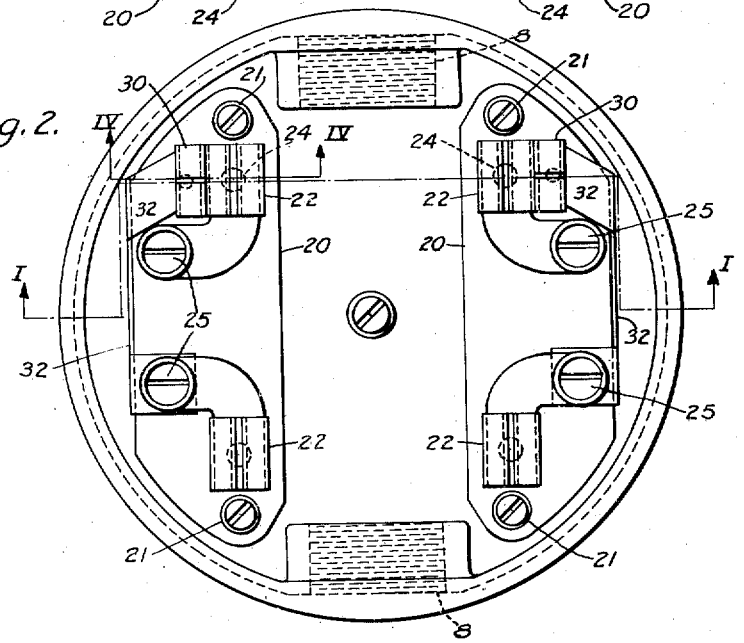
Figure 3:
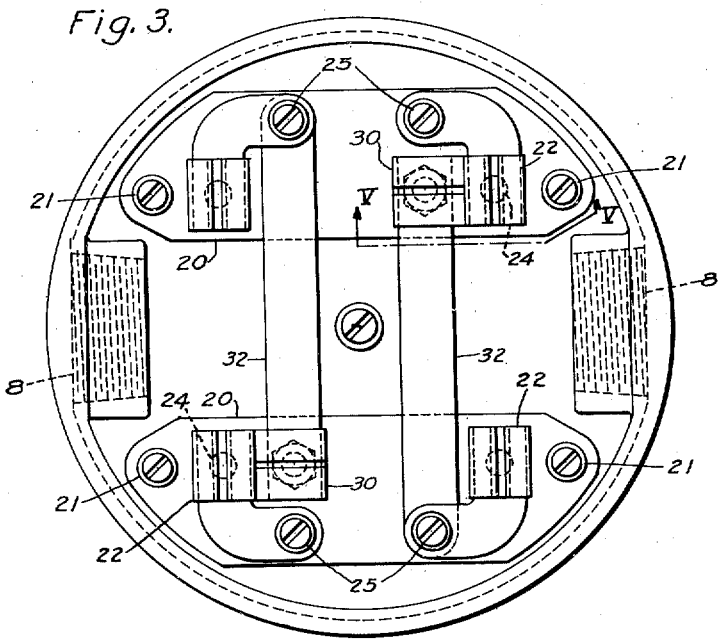
Figure 4:
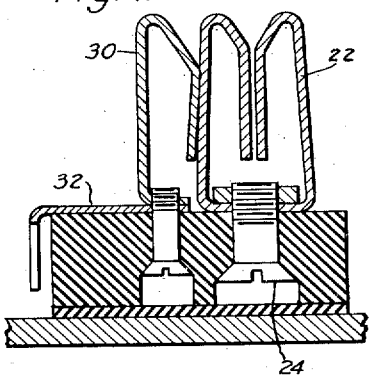
Figure 5:
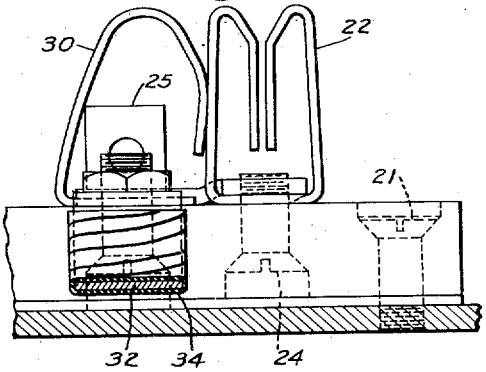

Referring to the drawings,

Figure 1 is a view in elevation, partially in section on line I—I of Fig. 2 of an instrument casing and its supporting receptacle constructed in accordance with the present invention, Fig. 2 is a plan view of the base of the assembly shown in Fig. 1, Fig. 3 is a modification of the invention shown in Fig. 2, Fig. 4 is a fragmentary view in vertical section taken on the line IV—IV of Fig. 2, and Fig. 5 is a fragmentary view in section taken on the line V—V of Fig. 3.

Referring more specifically to Figure 1 of the drawings, the invention contemplates a cover 2 for an electrical instrument mounted upon a base plate 4 and secured thereto in any suitable manner. The base plate 4 is proportioned to extend slightly into a base receptacle 6 which is substantially of cup shape having threaded bosses 8 cast in the side walls thereof. The peripheral edge of the receptacle 6 has an out-turned flange which is preferably of the same diameter as the base plate 4 of the instrument casing. When the instrument casing is in operative position with respect to the base receptacle, as shown in Fig. 1, a suitable securing ring 10 may be applied and sealed in position in any desired manner to prevent unauthorized removal of the meter casing.

As shown in Fig. 1, the instrument base plate 4 is provided with a plurality of depending contact blades 12 which in the present embodiment are four in number to provide circuit connections to the current and potential coils of a watthour meter mechanism (not shown) disposed under the cover 2. These contact blades extend through the base plate 4 and are prevented from being moved into the base by means of insulating plates 14 and cotter devices 16. Each of the insulating plates 14 is provided with an angularly disposed barrier 18 for a purpose described more fully hereinafter.

The base receptacle 6 is provided with two blocks 20 of insulating material which are suitably secured in position, as shown in Fig. 2, by means of screws 21. Upon each of the plates 20, there is mounted two contact jaws 22 secured in position (Fig. 1) by screws 24. Each contact jaw 22 is provided with an associated terminal 25 for connection to an external circuit. In practice, the load or service wires to a consumer's translating device will be extended through one of the bosses 8 and the two sides of the circuit secured to the terminals 25 of the two contact jaws adjacent such bosses. The other side of the circuit from the source of energy will be brought in through the other boss 8 and the two sides thereof connected to the adjacent terminals 25.

With the construction thus far described, it should be apparent that when the meter casing is placed into operative position on the base receptacle 6, the four contact blades 12 will be disposed in the position shown in Fig. 1 making electrical contact with their respective jaws 22. The circuit from the source of energy to the consumer is therefore completed, and the energy consumed will be measured by the mechanism within the casing 1.

In order to permit continuation of the supply of energy to the consumer when the meter is withdrawn from operative position, auxiliary contact jaws 30 are provided. Referring to Fig. 2 and more specifically to the left-hand side thereof, the auxiliary contact 30 is mounted adjacent to the upper contact jaw 22 and is normally spring biased into engagement with one side of the jaw 22. This construction is shown more clearly in Fig. 4. A conducting strip 32 has one end thereof secured to the jaw member 30 and extends along the insulating block 20 into engagement with the lower terminal 25 which in turn is electrically connected to the lower jaw 22.

As shown in Fig. 1, when the meter casing 1 is in operative position, the angularly extending barrier 18 is interposed between the auxiliary jaw 30 and the main jaw 22 so that the bridge between the two terminals 25 afforded by the strip 32 is broken. When the meter is withdrawn, however, the jaw 30 engages jaw 22 and in effect short circuits the two jaws 22 on the insulating block 20, so that there is a direct connection, as to one side of the line, from the source of energy through the strip 32 to the consumer's circuit.

Similarly, the auxiliary jaw 30 on the right-hand side of Fig. 2 and its associated strip 32 affords a bridge between the two main contact jaws 22 which will be broken by the corresponding insulating barrier 18 when the meter is in operative position.

The structure shown in Figs. 1 and 2 is adapted to be used when the conduit connections engaging the bosses 8 are vertically disposed. In Fig. 3 a modification is illustrated to take care of the situation where the conduit engaging the bosses extends horizontally. The principles of both constructions are the same and corresponding reference numerals are employed for the corresponding parts. The only real difference is that the bridging strips 32 of Fig. 2 extend between the two insulating blocks 20 rather than between the contacts on one of said blocks. In this case, further, the bridging strips 32 are suitably insulated, such as by tape 34, as shown more clearly in Fig. 5. Also, the auxiliary contacts 30 may be bifurcated, as shown in Fig. 3, to impart a greater resiliency if desired. It is believed that further explanation of the modifications shown in Figs. 3 and 5 is unnecessary.

It should be apparent from the foregoing that in accordance with the invention an improved mounting has been provided for watthour meters, whereby the meter is connected into the circuit to be measured by the operation of placing it in operative position, and whereby the removal of the meter does not break or interrupt such circuit. Quite obviously, although the drawings illustrate the invention as applied to a meter, it is not necessarily limited to such application but may be applied to the mounting of any electrical instrumentalities such as indicating instruments, time switches, and the like.

Various modifications may be made in the structure disclosed without departing from the spirit of the invention and it is desired that no limitation shall be placed upon it except as imposed by the prior art and set forth in the appended claims.

I claim as my invention:

1. In a mounting for an electrical instrumentality including a casing therefor having contacts projecting therefrom and a supporting base structure having contacts for engaging the casing contacts when the casing is in operative position, and means for bridging certain of said base contacts when the casing is removed from such position; said bridging means including a conducting member resiliently engaging one of the base contacts, and means operative when said casing is placed in operative position for inserting a non-conducting member between said resiliently engaging elements.

2. In a mounting for an electrical instrumentality, including a casing therefor having contacts projecting therefrom and a supporting base structure having contacts for engaging the casing contacts when the casing is in operative position, and means for bridging certain of said base contacts when the casing is removed from such position; said bridging means including a conducting member resiliently engaging one of the base contacts, and means carried by the instrument casing for insertion between said base contact and the member resiliently engaging it.

3. In a mounting for an electrical instrumentality including a casing therefor having contacts projecting therefrom and a supporting base structure having contacts for engaging the casing contacts when the casing is in operative position, and means for bridging certain of said base contacts when the casing is removed from such position; said bridging means including a conducting member electrically connected to one base contact and engaging another, and means controlled by the placing of said casing in operative position on said base for wedging apart said conducting member and the base contact with which it engages.

4. In combination with an electrical circuit to be measured, an encased electrical instrument having contacts projecting from the casing thereof, a base proportioned to support said instrument casing and having contact means disposed thereon to complete a circuit through said casing contacts and said electrical instrument when the casing is in operative position on said base, auxiliary means for completing a circuit between said base contact means comprising a contact strip, electrically connected to one of said contact means and resiliently engaging another of them, and means for rendering said auxiliary means ineffective when said casing is in operative position on said base comprising a member carried by said casing for wedging apart said strip and the contact means with which it is resiliently engaged.

5. A detachable electrical instrument comprising in combination, an instrument mechanism having a set of terminal contacts and a receptacle for receiving said instrument mechanism comprising in combination, a base, a set of terminal contacts mounted thereon to cooperate with the contacts of said instrument mechanism, and a circuit closing jumper attached at one end to one of the terminal contacts of said receptacle, having a free end extending towards one of the other terminal contacts of said receptacle and resiliently engaging it when said instrument mechanism and its receptacle are separated, but being adapted to be depressed by said instrument mechanism to disengage the terminal contact when the instrument mechanism and its receptacle are united.

6. A receptacle for a detachable electrical device comprising in combination, a base, a plurality of terminal clips mounted thereon, and a circuit closing jumper attached at one end to one of the terminal clips, having a free end extending towards one of the other terminal clips and resiliently engaging it, but being depressible to disengage the terminal clip.

7. A detachable electrical instrument comprising in combination, an instrument mechanism having a set of terminal contacts and a receptacle for receiving said instrument mechanism comprising in combination, a base, a set of terminal contacts mounted thereon to cooperate with the contacts of said instrument mechanism, and a circuit closing connector device attached at one end to one of the terminal contacts of said receptacle, having a free end extending towards one of the other terminal contacts of said receptacle and resiliently engaging it when said instrument mechanism and its receptacle are separated, but being adapted to be depressed by said instrument mechanism to disengage the terminal contact when the instrument mechanism and its receptacle are united.

8. A receptacle for a detachable device comprising in combination, a base, a plurality of terminal clips mounted thereon, and a circuit closing connector device attached at one end to one of the terminal clips, having a free end extending towards one of the other terminal clips and resiliently engaging it, but being depressible to disengage the terminal clip.

WALTER G. MYLIUS.